(12) United States Patent
Nativel et al.

(10) Patent No.: US 12,492,014 B2
(45) Date of Patent: Dec. 9, 2025

(54) TEST SYSTEM FOR AT LEAST ONE AIRCRAFT NAVIGATION INSTRUMENT

(71) Applicant: ATEQ, Les Clayes-sous-Bois (FR)

(72) Inventors: Gabriel Nativel, Les Clayes-sous-Bois (FR); Frederic Platel, Les Clayes-sous-Bois (FR)

(73) Assignee: ATEQ, Les Clayes-sous-Bois (FR)

( * ) Notice: Subject to any disclaimer, the term of this patent is extended or adjusted under 35 U.S.C. 154(b) by 251 days.

(21) Appl. No.: 18/267,485

(22) PCT Filed: Dec. 9, 2021

(86) PCT No.: PCT/EP2021/084911
§ 371 (c)(1),
(2) Date: Jun. 15, 2023

(87) PCT Pub. No.: WO2022/128718
PCT Pub. Date: Jun. 23, 2022

(65) Prior Publication Data
US 2024/0034485 A1    Feb. 1, 2024

(30) Foreign Application Priority Data
Dec. 18, 2020 (FR) ...................................... 2013670

(51) Int. Cl.
*B64F 5/60*    (2017.01)

(52) U.S. Cl.
CPC ...................... *B64F 5/60* (2017.01)

(58) Field of Classification Search
CPC ......... B64F 5/60; G01D 2218/10; G01P 5/16; G01P 21/00; G07C 5/0825; G01S 19/14; G01S 19/03
See application file for complete search history.

(56) References Cited

U.S. PATENT DOCUMENTS

| 5,023,791 A | 6/1991 | Herzberg et al. |
| 6,915,189 B2 * | 7/2005 | Igloi ........................ B64F 5/60 701/14 |
| 10,301,042 B2 * | 5/2019 | Piggin .................. G07C 5/0825 |

(Continued)

FOREIGN PATENT DOCUMENTS

| CN | 105091834 A | 11/2015 |
| WO | 2019096759 A1 | 5/2019 |

OTHER PUBLICATIONS

General Electric Company, "GE Digital Solutions GE Air Data Test Sets ADTS542F/552F/553F/554F User Manual K0553 Revision D", GE Measurement & Control, Jan. 1, 2016 (Jan. 1, 2016), pp. 1-156, 2016.

*Primary Examiner* — Mussa A Shaawat
(74) *Attorney, Agent, or Firm* — Dierker & Kavanaugh, P.C.

(57) ABSTRACT

The present invention relates to a test system (1) for at least one aircraft navigation instrument (3), said system comprising: a test device (5) capable of being connected to at least one sensor on which the navigation instrument relies to provide a value, said test device being configured to test said sensor by changing its state; a database comprising at least one predetermined value corresponding to a value to be provided by said navigation instrument when said test device changes the state of said at least one sensor associated with said navigation instrument.

10 Claims, 2 Drawing Sheets

(56) References Cited

U.S. PATENT DOCUMENTS

| | | | | |
|---|---|---|---|---|
| 2009/0102296 A1* | 4/2009 | Greene | .................. | H01Q 1/243 |
| | | | | 307/149 |
| 2010/0234068 A1* | 9/2010 | Bolton | .................. | G06F 13/387 |
| | | | | 455/557 |
| 2013/0204487 A1* | 8/2013 | Ovens | ...................... | B64F 5/00 |
| | | | | 701/33.2 |
| 2016/0196698 A1* | 7/2016 | O'Dell | .................. | B64D 45/00 |
| | | | | 701/33.4 |
| 2018/0290766 A1* | 10/2018 | Piggin | ..................... | G01S 19/14 |
| 2019/0382140 A1 | 12/2019 | Giroux et al. | | |
| 2022/0106060 A1* | 4/2022 | Morrison | ................ | B64C 27/20 |
| 2023/0155703 A1* | 5/2023 | Palreddy | ............ | H04B 7/18506 |
| | | | | 375/224 |

* cited by examiner

TEST SYSTEM FOR AT LEAST ONE AIRCRAFT NAVIGATION INSTRUMENT

The present invention relates to the field of aircraft testing, and more particularly to systems for testing at least one aircraft navigation instrument.

It should be noted that by aircraft, it should be understood any transportation means capable of rising and moving at altitude within the terrestrial atmosphere, such as an airplane, a helicopter, a drone, an ULM, etc.

Thus, an aircraft comprises navigation instruments or flight instruments enabling the pilot steering said aircraft to know, for example, the altitude, the speed, the rate of climb, etc.

In general, these navigation instruments are display means connected to one or more sensor(s). Thus, a navigation instrument provides a relevant value or information that can be interpreted by the pilot, the information provided by said instruments relying on at least one value of a physical quantity measured by the sensor(s).

It should be noted that by sensor, it should be understood all of the mechanical and/or electronic elements that allow measuring a physical quantity (for example a pressure, a temperature, etc.) and whose value allows displaying a piece of information useful to the pilot (for example an altitude, a speed, etc.). Thus, the altimeter gives an altitude (in metres) according to the pressure measurements made through the Pitot tubes and/or the static ports.

Thus, to guarantee the safety of the aircraft, of the pilot, of the passengers and to guarantee an optimum operation of said aircraft, the navigation instruments must be tested and calibrated at regular intervals using appropriate systems, such as systems for testing aircraft navigation instruments.

As examples of navigation instruments, mention may be made of navigation instruments connected to the anemometric system of the aircraft, such as static ports and/or Pitot tubes. Thus, these navigation instruments, such as the altimeter, the variometer, and/or the speedometer, rely on the pressure values measured through a static port and/or a Pitot tube to provide values for altitude, speed, etc.

In general, a test system comprises several portions, a test device (for example an anemo-barometric pressure generator) which is attached on the sensors associated with the navigation instruments that one wishes to test and a remote or wireless device. In particular, said remote device enables the operator to supervise the test by being located proximate to the navigation instruments and to verify the value provided by said instruments during the test.

Indeed, the test device acts on the sensor(s) associated with a navigation instrument, in particular by modifying the state of the sensor so that the flight instrument provides a certain value. This value must then be verified by the operator and must correspond to a predetermined value, generally defined by the manufacturer of the aircraft. This predetermined value may also be accompanied with an acceptable error margin (or threshold), the value provided during the test by the instrument then having to be within the range of values defined by the predetermined value and its error margin so that the operator considers that the navigation instrument and its associated sensor are functioning properly and/or do not need to be repaired or calibrated.

It should be noted that by modifying the state of the sensor, it should be understood making the value of the physical quantity measured by said sensor vary. Thus, for example, by applying a depression or an overpressure to Pitot tubes and/or static ports, it is possible to make the altitude value displayed by the altimeter vary, thereby simulating the ascent in altitude of the aircraft.

There are many aircrafts (airplanes, drones, etc.), each aircraft model having particular specifications, therefore different predetermined values and acceptable error margins. Each of the measuring instruments is configured to provide information that can be interpreted by the pilot, however these values must be correct enough. For example, a flight route for an airliner is about 1,000 feet (i.e. about 305 m), it is thus recommended that the error on the altimeter be much lower, in order to avoid a possible collision, because the aircraft is not in its flight route.

Thus, normally, the operator must consult the manual or the charts for each one of the tested aircrafts and verify accordingly that the provided value is correct.

Thus, the operator must be careful to refer to the right specifications (or charts), read and correctly transcribe the value provided by the flight instrument, then calculate that the deviation from the expected predetermined value is within the acceptable error margin as defined by the manufacturer.

Moreover, it should be noted that aircraft navigation instrument test systems already exist on the market, like those mentioned in the "User Manual K0553 Revision D", or in the patent application US 2018/029766.

Hence, one could notice that many human errors might occur when testing of navigation instruments, this is why the present invention aims in particular to make the process of testing the aircraft navigation instruments more reliable by providing a new system for testing at least one aircraft navigation instrument, said system comprising:
  a test device able to be connected to at least one sensor on which the navigation instrument relies to provide a value, said test device being configured to test said sensor by modifying its state;
  a wireless device comprising a human-machine interface, as well as an image acquisition means, said wireless device being configured first to control the test device and second to acquire, via said image acquisition means, the value provided, during a test, by said at least navigation instrument;
  a database comprising at least one predetermined value corresponding to a value to be provided by said navigation instrument upon modification of the state of the sensor associated with said navigation instrument by said test device. Thus, said database enables the operator performing the test of the navigation instrument to compare the value provided by said instrument with the predetermined value in the database of the test system, thereby limiting the risk of error of the operator.

According to a possible feature, said database comprises predetermined values for several navigation instruments. Advantageously, several predetermined values are memorised for one or more navigation instrument(s), for example according to the aircraft, the temperature, the altitude, etc.

According to another possible feature, said database also comprises an acceptable error margin for each predetermined value.

It is advantageous that the error thresholds or the error margins be stored in the database, thereby making it easier for the operator to determine whether the value provided by the navigation instrument is within a defined range of values in the following manner, the predetermined value more or less the associated error margin, and that the operator could conclude whether or not the tested navigation instrument is compliant.

It should be noted that the error margin may be a fixed value or a percentage of the value provided by said instrument (and also depend on environmental parameters, such as the temperature, the humidity, the altitude, etc.). For example, the pressure value collected through the Pitot tubes and/or the static ports may be very variable depending on the altitude of the place and the weather, it is therefore important to take into account its parameters when setting the navigation instruments connected to the anemo-barometric system.

According to another possible feature, said database relating to said at least one navigation instrument is organised by aircraft manufacturer and model.

The fact that the database includes predetermined values accompanied with error margins organised (or classified) by aircraft manufacturer and model enables the operator to quickly and easily find out the relevant values when testing the navigation instruments.

It should be noted that said predetermined values and the error margins are for example memorised beforehand in said database, in particular based on the data provided by the aircraft manufacturers. It is also possible to provide for a remote update of said database.

According to another possible feature, said system is configured to compare the value provided by the navigation instrument during a test with the corresponding predetermined value stored in said database.

The operator enters the value provided by said navigation instrument into the system, for example after having indicated the manufacturer and model of the tested aircraft, the system then automatically comparing the provided value with the predetermined value stored in the database. This results in limiting human errors, like an input error or inattention error.

According to another possible feature, the system is configured to validate the comparison if the comparison of the value provided by the navigation instrument during a test with the corresponding predetermined value stored in said database is lower than or equal to the acceptable error margin associated with said predetermined value of said at least one navigation instrument.

According to another possible feature, each comparison and comparison result is memorised.

In this case, the tests, comparisons and comparison results may be stored in a memory of the system and/or on a remote server. In particular, this allows having a follow-up on the performed tests, their frequencies, etc.

According to another possible feature, each memorised comparison result further comprises a timestamp and/or a record of the identifier of the operator having performed the test of said at least one navigation instrument.

It is advantageous to time-stamp and/or to be able to identify the operator having performed the test in the context of quality monitoring of the tested aircrafts, but also of the operators.

It should be noted that by timestamp, it should be understood the fact of associating a date and a time with an event, herein the test of a navigation instrument.

According to another possible feature, each comparison result is associated with a piece of information allowing identifying the tested aircraft, such as a serial number, the brand, the model, etc.

According to another possible feature, said system comprises a human-machine interface configured to allow entering the value provided, during a test, by the navigation instrument into said test system.

For example, the human-machine interface is a keyboard with a screen, a touchscreen, voice command recognition software, etc.

According to another possible feature, said system comprises a means for acquiring the value provided, during a test, by said at least one navigation instrument.

The fact that said test system comprises an acquisition means independent of the operator allows in particular reinforcing the reliability of the tests and further limiting the risk of error.

It should be noted that by acquisition means, it should be understood any means allowing acquiring or recording the value provided by the instrument during the test. For example, the acquisition means may be a means for communication with the on-board computer of the aircraft or with the navigation instrument, in order to be able to directly collect the value provided by said instrument.

According to another possible feature, said acquisition means is an image acquisition means, such as a video camera or a camera.

Advantageously, said acquisition means may also be an image acquisition means of one or more navigation instrument(s).

According to another possible feature, said acquisition means is configured to acquire a plurality of images provided by said at least one navigation instrument, said system being configured to determine, after a digital processing of said images, the value provided, during a test, by said at least one navigation instrument.

According to another possible feature, said system is configured to test at least one or more of the following navigation instruments: altimeter, variometer, speedometer, geolocation system, angle-of-attack probe, transponder, attitude indicator.

According to another possible feature, said system comprises a wireless device configured to control the test device. Advantageously, said wireless device is configured to remotely communicate with the test device and/or to connect to the Internet.

According to another possible feature, said wireless device comprises said human-machine interface.

The invention will be better understood, and other aims, details, features and advantages thereof will appear more clearly throughout the following description of a particular embodiment of the invention, given only for illustrative and non-limiting purposes, with reference to the appended drawings, wherein.

Figure 1:
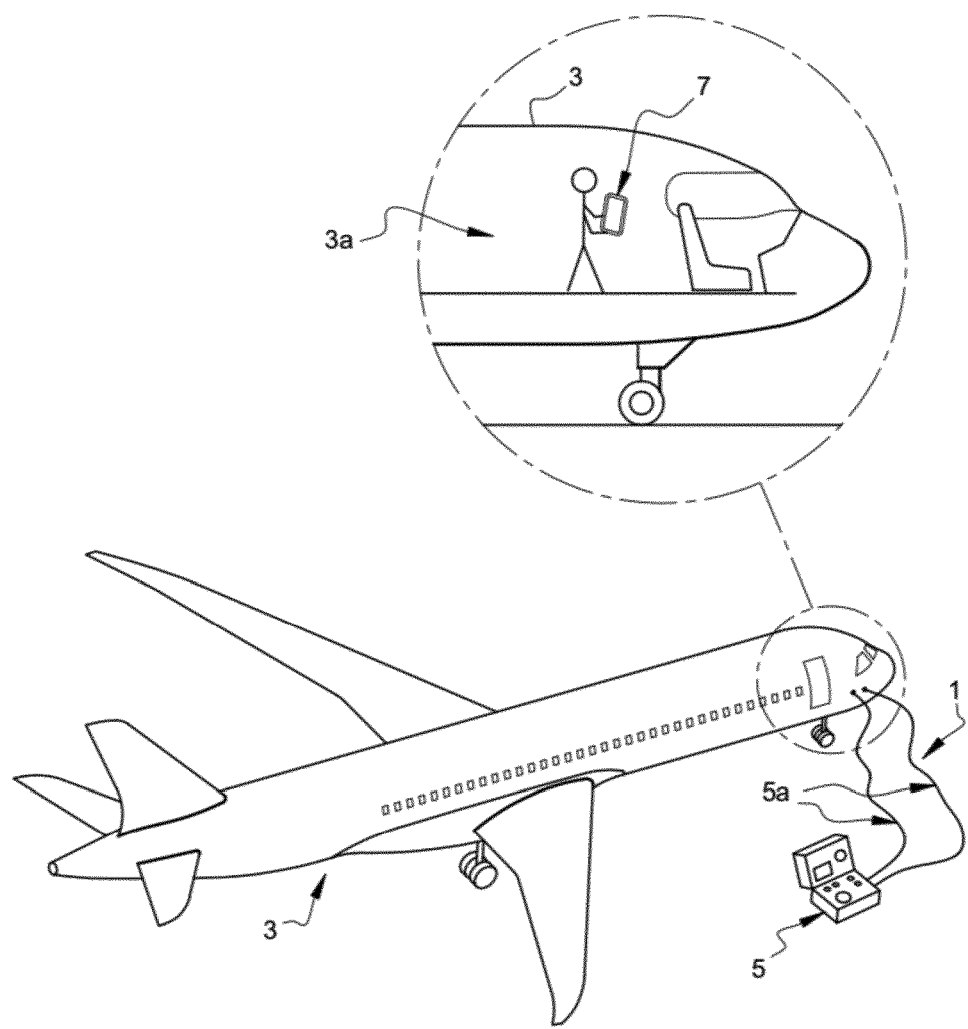
FIG. 1, is a very schematic representation of a test system according to the invention in operation on an airplane.

Thus, FIG. 1 is a schematic representation of a test system 1 for an aircraft navigation instrument 3, such as an airliner.

Thus, in this embodiment, said test system 1 comprises:
- a test device 5 able to be connected to at least one sensor on which the navigation instrument relies to provide a value;
- a wireless device 7 comprising a human-machine interface, such as a remote-control, a tablet, a mobile phone or any other suitable electronic device;
- a database comprising at least one predetermined value corresponding to a value to be provided by said navigation instrument upon modification of the state of the sensor associated with said navigation instrument by said test device.

The example illustrated herein by [FIG. 1] relates in particular to the tests of navigation instruments related to the anemometric system of the airplane 3, i.e. to the static ports and/or to the Pitot tubes of said airplane.

For example, these navigation instruments are the altimeter, the variometer, the speedometer, etc.
However, it should be noted that the system according to the invention can also be applied to other navigation instruments, such as the geolocation system, the attitude indicator, the transponder, the angle-of-attack probe, etc.

Thus, the test device 5 is in the form of a suitcase comprising pressure sources (or an anemobametric pressure generator) and hoses 5a allowing connecting to the static ports and/or Pitot tubes in order to make the pressure applied to these elements vary.
Hence, said test device 5 is configured to test a navigation instrument by modifying the state of the sensor associated therewith, herein a Pitot tube and/or a static port.

In this embodiment, said database is stored in the wireless device 7, in order to enable the operator performing the test of the navigation instrument to compare the value provided by said instrument with the predetermined value in the database. The database may also be stored in the test device 5 or on a remote server accessible remotely via the wireless device 7.

Preferably, said database comprises predetermined values and their acceptable error margins for one or more navigation instrument(s) of different aircraft(s), said database of said values being organised by aircraft manufacturer and model. For example, said predetermined values and their error margins are derived from charts and data provided by the aircraft manufacturers, but may also be entered manually by the operator into said database.

The predetermined values memorised in the database may also be variable according to environmental parameters, such as the temperature, the humidity level, the altitude, etc. For example, said environmental parameters are entered into the system 1 by the operator or measured directly by suitable sensors (for example a temperature sensor, a hygrometer, etc.) which are accommodated in the test device 5 and/or the wireless device 7.

It should be noted that by error margin or error threshold, it should be understood the acceptable error for it to be considered that the navigation instrument is functioning properly, the error margin may be a fixed value or a percentage of the value provided by said instrument.

In particular, the human-machine interface of said device 7, such as a keyboard, a touchscreen or not, etc., is configured to enable (the operator) to enter the value provided, during a test, by the navigation instrument into said test system 1.

In a variant of the invention, not represented, said wireless device 7 further comprises a means for acquiring the value provided by at least one of said navigation instruments during the test.
For example, said acquisition means is a camera, but may be any acquisition means allowing acquiring the value provided by a navigation instrument, such as a photographic camera.

Thus, it should be noted that by acquisition means, it should be understood any means (or interface) allowing acquiring or recording the value provided by the instrument during the test. For example, the acquisition means may be a means (or an interface) for communication with the on-board computer of the aircraft or with the navigation instrument, in order to be able to directly collect the so value provided by said instrument.

The camera of said wireless device is a means for acquiring images of one or more navigation instrument(s) which is configured to acquire a plurality of images from at least one navigation instrument. Afterwards, said images are digitally processed to determine the value provided or displayed by said at least one navigation instrument. The digital processing may be carried out by the wireless device, the test device and/or on a remote server where said images are stored.

The wireless device 7 may also comprise several image acquisition means, such as a camera and an interface connecting to the on-board computer of the aircraft, allowing having a double verification and detecting errors related to the display of the value by the navigation instrument. Said system may also require the operator to enter the value provided during the test by the navigation instrument in addition to the values acquired by one or more acquisition means, that being so in order to make the tests of said navigation instruments more robust.

The operator may also validate the value suggested by the system (i.e. the value acquired via the acquisition means) or, where appropriate, enter another value.

The value(s) provided by the navigation instrument during a test are then compared with the corresponding predetermined value stored in said database. The system 1 is configured to validate the comparison while taking into account the acceptable error margin associated with said predetermined value of said at least one navigation instrument. More particularly, the system is configured to validate the comparison, if the comparison of the value provided by the navigation instrument during a test with the corresponding predetermined value stored in said database is lower than or equal to the associated acceptable error margin.

Figure 2:
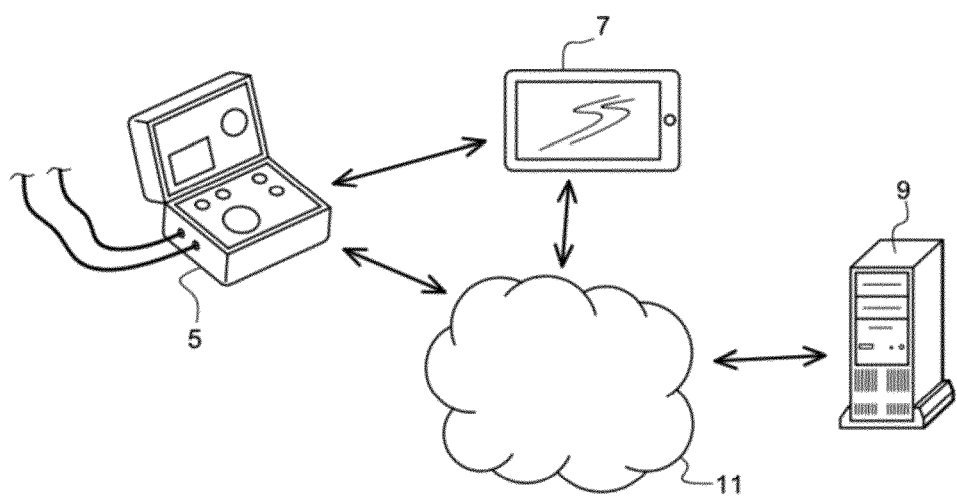
FIG. 2, is a very schematic representation of the test system of FIG. 1 and its connectivity.

Each of the comparisons and comparison results is memorised in a memory (not represented) of the system 1. Moreover, as illustrated in [FIG. 2], said comparisons and comparison results are preferably sent on a remote server 9 in order to be stored (for example for a subsequent processing).

In addition, each memorised comparison result may also comprise a timestamp and/or the association of the identifier of the operator having performed the test of said at least one navigation instrument.

Thus, during a test, the operator connects the test device 5 to the appropriate sensors and afterwards positions himself in the cockpit 3a of the airplane 3 with the wireless device 7. For example, said sensors are the Pitot tubes, the static ports, the GPS chip, etc. Of course, the sensor on which the test device is attached depends on the tested navigation instrument.
Then, the operator launches the test via the wireless device 7, said devices 5 and 7, as illustrated in [FIG. 2] being able to communicate with each other by a wireless communication means, such as wifi, Bluetooth, radio waves, etc.

Moreover, it should be noted that said devices 5 and 7 can advantageously send data to the remote server 9 for storage, for example via a computer network 11 (local or not). For example, the sent data relate to the performed measurements, comparison results, the performed actions, the status of the devices, etc.

The operator positions the acquisition means, such as a camera, of the wireless device 7 opposite the tested navigation instrument, for example following an indication from the wireless device 7. For example, this operation is performed following instructions provided via the human-machine interface of said device 7.

The acquisition means of the device 7 in cooperation with the test device 5 determines the value provided by the tested navigation instrument.

Said value acquired by said acquisition means is then compared with the appropriate predetermined value present in the database, taking into account the associated error margin.

Thus, if the acquired value is within the range of values, a range defined by the predetermined value more or less the error margin, the system 1 indicates to the operator that the result of the test is correct.

Otherwise, the operator is warned that the tested navigation instrument and/or its associated sensors might be defective and require further examination, and possibly repairs or calibration.

The invention claimed is:

1. A system for testing at least one aircraft navigation instrument, said at least one aircraft navigation instrument being at least one of the following navigation instruments: an altimeter, a variometer, or a speedometer, said system comprising:
   - a test device adapted to be connected to at least one sensor on which the at least one navigation instrument relies to provide a value, said test device being configured to test said at least one sensor by modifying its state;
   - a wireless device comprising a human-machine interface, as well as an image acquisition means, said wireless device being configured first to control the test device and second to acquire, via said image acquisition means, the value provided, during a test, by said at least one navigation instrument; and
   - a database comprising at least one predetermined value corresponding to a value to be provided by said at least one navigation instrument upon modification of the state of said at least one sensor associated with said at least one navigation instrument by said test device, wherein said system is further configured to compare the value provided by the at least one navigation instrument during the test, and acquired via the image acquisition means, with the corresponding predetermined value stored in said database.

2. The system according to claim 1, wherein said database also comprises information on an acceptable error margin for each predetermined value.

3. The system according to claim 1, wherein said database relating to said at least one navigation instrument is organised by aircraft manufacturer and model.

4. The system according to claim 1, wherein the system is further configured to validate the comparison, if the comparison of the value provided by the at least one navigation instrument during the test with the corresponding predetermined value stored in said database is lower than or equal to an acceptable error margin associated with said predetermined value of said at least one navigation instrument.

5. The system according to claim 4, wherein each comparison and comparison result is memorised.

6. The system according to claim 5, wherein each memorised comparison result further comprises a timestamp and/or a record of an identifier of an operator having performed the test of said at least one navigation instrument.

7. The system according to claim 1, wherein the human-machine interface is configured to allow entering the value provided, during the test, by the at least one navigation instrument into said system.

8. The system according to claim 7, wherein the system is further configured so that an operator enters the value provided by the at least one navigation instrument during the test in addition to the values acquired by said image acquisition means or validates the value acquired via the image acquisition means.

9. The system according to claim 1, wherein the predetermined values memorised in the database can also be variable according to environmental parameters including at least one of: temperature, humidity level, or altitude.

10. The system according to claim 1, wherein said image acquisition means is configured to acquire a plurality of images provided by said at least one navigation instrument, said system being configured to determine, after a digital processing of said plurality of images, the value provided, during the test, by said at least one navigation instrument.

* * * * *